US007007207B2

(12) United States Patent
Emek et al.

(10) Patent No.: US 7,007,207 B2
(45) Date of Patent: Feb. 28, 2006

(54) SCHEDULING OF TRANSACTIONS IN SYSTEM-LEVEL TEST PROGRAM GENERATION

(75) Inventors: Roy Emek, Kfar Shmaryahu (IL); Yehuda Naveh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/277,520

(22) Filed: Oct. 21, 2002

(65) Prior Publication Data

US 2004/0078742 A1 Apr. 22, 2004

(51) Int. Cl.
G06F 11/00 (2006.01)
(52) U.S. Cl. .................. 714/703; 714/737; 703/21
(58) Field of Classification Search ................ 714/739, 714/703; 700/86; 703/21
See application file for complete search history.

(56) References Cited

U.S. PATENT DOCUMENTS

| 4,550,406 | A | * | 10/1985 | Neal ........................... 714/734 |
| 5,202,889 | A | * | 4/1993 | Aharon et al. ............... 714/739 |
| 5,646,949 | A | * | 7/1997 | Bruce et al. ................. 714/739 |
| 5,774,358 | A | * | 6/1998 | Shrote ......................... 700/86 |
| 6,006,028 | A | * | 12/1999 | Aharon et al. ................ 703/21 |
| 6,606,721 | B1 | * | 8/2003 | Gowin et al. ................ 714/728 |
| 2003/0220780 | A1 | * | 11/2003 | Fallah et al. ................... 703/21 |

OTHER PUBLICATIONS

IBM Technical Disclosure NN9312529, "RISC Microcontroller Central Processor Unit Timer Model", Dec. 1, 1993; vol. 36, Issue 12, pp 529-532.*

IBM Technical Disclosure NN9308675, "Creation of Simulation Test Cases for New Hardware on Prev ious Generation Hardware", Aug. 1, 1993; vol. 36, Issue 8, pp 675-680.*

Fallah et al., "A New Functional Test Program Generation Methodology", IEEE ICCD Computer Design Conference, Sep. 23-26, 2001, pp 76-81.*

Montemayor et al., "Multiprocessor Design Verification for PowerPC 620 Microprocessor", IEEE Conference on Computer Design, Oct. 2-4, 1995, pp 188-195.*

D. Geist, G. Biran, T. Arons, M. Slavkin, Y. Nustov, M. Farkas, K. Holtz, A. Long, D. King, S. Barrett, 'A Methodology For the Verification of a "System on Chip",' *Proceedings of the Design Automation Conference DAC99*, New Orleans, Lousiana, 1999, 6 pages.

D. Harel, 'Statecharts: A Visual Formalism for Complex Systems', *Science of Computer Programming* 8 (1987) (North-Holland), pp. 231-274.

L. Lamport, 'On Interprocess Communication, Part I: Basic Formalism,' pp. 1-12. *Distributed Computing*, Copyright 1986 by Springer-Verlag with permission.

* cited by examiner

*Primary Examiner*—Joseph Torres
*Assistant Examiner*—John P. Trimmings
(74) *Attorney, Agent, or Firm*—Stephen C. Kaufman

(57) ABSTRACT

A test-program generator capable of implementing a methodology, based on a formal language, for scheduling system-level transactions in generated test programs. A system to be tested may be composed of multiple processors, busses, bus-bridges, shared memories, etc. The scheduling methodology is based on an exploration of scheduling abilities in a hardware system and features a Hierarchical Scheduling Language for specifying transactions and their ordering. Through a grouping hierarchy, which may also be expressed in the form of an equivalent tree, the Hierarchical Scheduling Language combines the ability to stress related logical areas of the system with the possibility of applying high-level scheduling requests. A method for generating testcases based on request-files written in the Hierarchical Scheduling Language is also presented.

6 Claims, 8 Drawing Sheets

SCHEDULING OF TRANSACTIONS IN SYSTEM-LEVEL TEST PROGRAM GENERATION

FIELD OF THE INVENTION

The present invention relates to generating test programs for complex systems, and, more particularly, to the scheduling of system-level transactions output from a random test-program generator used for functional verification of hardware systems.

BACKGROUND OF THE INVENTION

It is widely recognized that verification of modern hardware design involves an effort comparable to that invested in the design itself. For complex designs, elaborate testcases aimed at confirming the functional correctness of the design are necessary. Naturally, smaller and less complex units are simpler to verify, and the results of their verification can be accepted with greater confidence than in more complex cases. Therefore, in a system composed of a number of components, it is always beneficial to commit to a complete, independent, verification effort for each of the constituent components. However, there are three reasons why, in general, it is not sufficient to limit verification testing to the component level, and why verification of the system as a whole should also be performed:

First, it may happen that while each of the constituents of the system behaves according to specification, there is still a mismatch between the interfaces of two interacting components in the system. For example, two components may send concurrent signals to two ports of a third component, but the latter may have a specification that allows accepting signals at only one port at a time.

Second, it is often difficult to artificially generate stimuli that cover the entire specification of a complex component. For example, building a bus behavioral for a complex interface that generates all possible packet types is a large and expensive task. It may therefore be preferable to verify some aspects of a units behavior some packet types in the present example only as part of the entire system, in which the complex interface is stimulated by other real units of the system.

Third, in practice, the stimuli generated by a real system may have different characteristics from artificially-generated stimuli, and this difference may be impossible to predict. Verifying a unit in the context of the real system may therefore uncover design flaws that otherwise would escape detection.

System-level testing is accomplished by generating sets of system-level transactions that exercise the complete system as a whole. The entire space of possible system-level transactions is typically extremely large, and it is therefore possible to test only a very small, and necessarily restricted portion of this space. In order for a verification plan having such a restricted set of test transactions to be meaningful, the tests must be diverse enough to stimulate all significant logical areas of the design under test, while at the same time being specific enough to stress particular logical areas that are prone to error. A typical way of handling this is to use an automated test-program generator for randomly creating tests that stimulate the system according to the foregoing guidelines.

System-level transactions must be scheduled in a particular manner, because the outcome of any set of transactions may depend critically on the sequence. There are, however, three general problems in scheduling the transactions for system-level verification:

1. System-level transactions are high-level entities whose start and end times are often not well-defined. It is therefore not a priori evident what types of transaction-scheduling scenarios are even possible.
2. It is not evident how to request transaction-scheduling scenarios on top of other test-generator requests, which are generally aimed at stressing specific logical areas of the design under test. To optimize the randomness of the test, transaction-scheduling scenarios should be allowed to remain unspecified when not explicitly required to be specified. The term partial specification herein designates the ability to leave some transaction-scheduling parameters unspecified in a test-generation environment.
3. An algorithm for scheduling many transactions is sometimes necessary to achieve a particular aspect of the test-plan, but a simple general algorithm for this does not yet exist.

FIG. 1 shows a model-based test-program generator 101 which accepts user-defined requests from a request file 107, and generates a testcase 109 which realizes request file 107 so that testcase 109 contains program code which fulfills the requests in request file 107 at the system level. Test-program generator 101 contains a system-specific system model 103 which describes the components, topology, and available transactions of the system to be exercised. System model 103 and request file 107 are input into a testcase engine 105, which outputs testcase 109. Testcase 109 is then used to stimulate the system for verification purposes. In general, repeated operation of test-program generator 109 for a given request file results in different valid testcases, and in this manner a suite of testcases can be generated. In addition to strict modeling of the specified behavior of each component under the various transactions, system model 103 may also include testing knowledge about the system that is not part of the hardware specification, but is believed to help direct test-program generator 101 in creating more interesting and meaningful tests.

Note that a set of transactions used in test-program generation may not be complete, and a system for generating test programs should support the addition of new transactions to the model.

Much of a test-program generators success in achieving the verification goals depends on the capabilities of the request file language. In particular, this language should be able to express in a natural way which types of transactions are to be generated by the generator for a particular set of tests, and which parameters are to be used with those transactions. The language should also allow for stressing a particular logical area of the design. Finally, the language must allow for partial specification in the request file, meaning that the user need not specify all parameters related to the test. Parameters not specified by the user are determined by the test-program generator, either randomly or according to testing knowledge.

Component versus Transaction View

When designing the semantics of the request language, there are two ways of viewing the system under verification. The first way is the component view, in which the language focuses separately on each of the components in the system. Interactions between components are treated merely as required for establishing the events stimulating the verified component. As an example, FIG. 2 illustrates a system 201 in which a set of processors 203 are connected through sets of busses 205, 213, and 217 and sets of bus bridges 207, 215, and 219 to a set of bus-behaviorals 221 that model, for example, I/O devices, as well as to shared resources, such as a set of memories 211 connected via a set of busses 209.

In the example presented above, a request language based on the component view might include a request such as:

$P_1$ executing 500 load/store transactions

Such a view is necessarily centered on the components that initiate transactions, such as processors 203 and sometimes I/O behaviorals 221. Consequently, it is difficult and unnatural to specify a request centered at $P_1$ (for example) in a way that would reflect the verification needs of the interaction between $B1_1$ and $B2_1$. In addition, when the system is symmetric with respect to some of the components, there is usually no purpose in specifying which of the components should participate in any given task, but such a specification is inherent in the component view. This overspecification unnecessarily reduces the randomness of a generated test.

A second possible view of a system with many components is the transaction view. Here, the emphasis is on the transactions that take place in the system, where each transaction involves a number of different components. By focusing on transactions, the test-plan inherently acknowledges that a component in a complex environment is never verified independently. Therefore, when designing a language consistent with this view, significant attention must be put into identifying the way components interact with one another.

To design such a language, it is necessary to define, for each unique manner of system interaction, a transaction that involves all components of that system interaction. The language then uses these definitions to express constructs such as:

500 I/O-to-Mem DMA where DMA stands for Direct Memory Access, a manner of system interaction which, in the example above, has transactions that involve I/O and memory. In this notation, transactions are named by concatenating the transactions initiator components (I/O), the transactions target components (Mem), and the operation done by the transaction (DMA), thus I/O-to-Mem-DMA.

The advantage of expressing actions in this manner is that the user is not concerned about how to stimulate an end-component (an I/O behavioral in the case of a DMA transaction) in order to produce favorable stimuli on one of the bus-bridges. This task is left for the generator. The user can specify, however, certain characteristics of each transaction. These may include, for instance, the specific type of stimuli on a particular bus-bridge.

Nevertheless, even in the transaction view, each component should still be allowed to be stressed by the testcase in order to increase the probability of finding bugs in the behavior of that component. To do so, the language allows expressions such as 300 CPU-to-I/O-MMIO transactions all originating at $P_3$, but terminating at any one of $M_1$ $M_{24}$, chosen at random, and an additional 200 CPU-to-Mem-Data-Transfer all from $P_3$, but going to either $MEM_1$ or $MEM_2$, where MMIO stands for Memory Mapped I/O.

Again, this scheme has the advantage of stressing $P_3$ not merely by random read/write access, but by access which may span a wider logical area of the system.

Transactions and Transaction-Scheduling

A random test program for the system-level has two complementary aspects: the set of transactions contained by the test program, and the scheduling, or sequence ordering, of those transactions. Prior art approaches typically neglect transaction-scheduling. However, neglecting transaction-scheduling, as, well as not allowing freedom in specifying the transaction-scheduling, leads to limitations in the prior art. There are a number of advantages to be gained by having control over transaction-scheduling requests.

Most important, by requesting that some transactions be scheduled in a particular order, or be otherwise regulated with respect to their timing, it is possible to explore specific logical areas that are prone to bugs. In particular, some design bugs may show up only when transactions occur in a specific order, are separated by a specific time interval, or are executed concurrently. This is especially true when the transactions are initiated by different components that access a common resource. There are other reasons related to the mechanism of test-generation for scheduling transaction requests: In general, requesting a definite order of transactions allows more flexibility in other types of user requests and allows a more accurate prediction of the final state of the system. For example, when two processors write to the same address, it is impossible to predict the data stored in that address at the end of the test unless the order of the write transactions is known.

Existing Test-Program Generator Languages

Many prior-art languages are capable of specifying time relations between various events, but there is no prior art language or formalism applicable to the scheduling of system-level test transactions. Hence, the prior art necessarily lacks a comprehensive and efficient transaction scheduler, and thus prior-art test-program generators are unable to process any system-level transaction-scheduling requests. At the root of this limitation is the lack of a language capable of expressing the various aspects of transaction-scheduling. Thus, it is useful to first consider the question of a formal language for describing and prescribing system-level transactions.

As is shown below, the fact that system-level transactions are high-level entities means that a language suitable for this task must have restrictions in the ability to express the timing relationships of transactions. In addition, if the language is to be useful in the context of test generation, there are other necessary attributes, such as the ability to express ordering between large groupings of transactions.

Examples of existing languages that have temporal constructs range from Java to temporal logic. A few of the representative languages are relevant to system-level transactions and test generation. An article by L. Lamport On interprocess communication, *Distributed Computing*, 1:76101, 1986 (herein referred to as Lamport) discloses a temporal language dealing with high-level transactions that has no notion of true time. Another example of a prior-art formalism partially-relevant to the area of interest is that of Interacting Processes (IP), which is based on standard constructs in applications-programming languages and operating systems which deal with concurrent asynchronous processes (such as threads). IP is a process-synchronizing language designed for programming specific scenarios in a multi-process environment, but is not suitable for generating test programs or for scheduling transactions in a test program. A further example of a prior art formalism that addresses similar issues has been presented by D. Harel in: StateCharts: A visual formalism for complex systems [*Science of Computer Programming*, 8(3):231 274, June 1987], which deals with general concurrent systems. There are significant difficulties in using such languages (as well as other temporal languages) for describing and specifying test-program generator requests, most notably in being unable to express partial specifications. The formalisms underlying these prior-art languages have no provision for randomness in the ordering of transactions. The ability to inject selective randomness into a test program is highly desirable, and a test-program generator with this ability is herein denoted as a random test-program generator. It is emphasized, however, that this ability may be selectively applied, and a random test-program generator is not restricted from producing completely deterministic output where desired.

Other problems with these languages also arise. IP requests are assigned to various processes in the system. The processes execute requests sequentially, but when a process encounters a synchronization request, that process waits and synchronizes with other processes according to specific constructs of the language. The language describes relationships between events in the time-line of each process, and is thus clearly based on the component view. StateCharts, for example, is a compact graphical language expressing various state-machine operations, and is designed to deal with concurrent events. However, StateCharts does not handle the issue of transaction-scheduling, and it has not been possible to combine a language of this type with other (non-scheduling) features necessary in a general test-generator request language.

Finally, it is noted that a methodology for system-verification using a non-model-based test-program generator was presented by D. Geist, G. Biran, T. Arons, M. Slavkin, Y. Nustov, M. Farkash, K. Holtz, A. Long, D. King, and S. Barret in A methodology for the verification of a system on chip (36*th Design Automation Conference*, DAC99, pages 574–579, 1999). This methodology also relies on the transaction view of the system, but the issue of transaction-scheduling is not disclosed in the cited publication.

There is thus a need for, and it would be highly advantageous to have, a test-generator which provides for scheduling transactions in system-level test generation, including an appropriate descriptive and prescriptive language. This goal is met by the present invention.

SUMMARY OF THE INVENTION

It is an objective of the present invention to provide a random test-program generator capable of scheduling system-level transactions. As part of this, it is also an objective of the present invention to provide a language for expressing and specifying the scheduling of transactions in testcases to be generated by the test-program generator, such that the language has an expressiveness at or near the limits of expressiveness of general scheduling-request languages imposed by the nature of system-level verification. It is moreover an objective of the present invention to provide a simple hierarchical scheduling language with limited expressiveness, but which is valuable in designing interesting system-level tests. It is yet another objective of the present invention to provide modeling and implementation of scheduling requests within a test-program generator.

Accordingly, the present invention addresses the scheduling aspects of randomly-generated system-level test programs. As part of this, the present invention discloses a general language suitable for scheduling system-level transactions generated by a test-program generator and explores the expressiveness of such a language. In addition to the practical use of a scheduling language in describing and prescribing temporal and other relationships between transactions, the concepts underlying the language form the basis for the system model and the testcase generator shown in FIG. 1.

It is demonstrated herein that the expressiveness of any system-level scheduling language is necessarily limited, and that there are certain potentially-serious practical problems inherent in using the presented general language. In place of the general language, then, the invention discloses a Hierarchical Scheduling Language, which is specifically designed for practical use. Although the Hierarchical Scheduling Language is limited in comparison with the theoretical limits presented, this language allows the application of scheduling requests on top of other requests related to test generation, and is therefore particularly suitable for the intended task.

The Hierarchical Scheduling Language disclosed herein also allows for a concise expression of complex multiple-transaction scheduling, and has a natural ability to handle partial specifications. By default, therefore, this language does not interfere with the randomness of the test-generator. Finally, the scheduling requests expressed by the Hierarchical Scheduling Language can be modeled and implemented by a test-program generator in a relatively simple manner. Furthermore, an algorithm for implementing scheduling requests according to the model are disclosed.

Thus, present invention solves the previously-discussed scheduling problems by:
1. Innovating, as part of a transaction model, initiating and notifying components for each transaction, and modeling of specific scheduling mechanisms between different such components.
2. Developing the Hierarchical Scheduling Language, which allows users to request three types of scheduling between transactions and between groupings of transactions.
3. Designing an algorithm which identifies the initiating and notifying components of a grouping of transactions, and implements the requested scheduling between such groupings.

The present invention is of a test-program generator transaction scheduler capable of accepting as input statements written in a language as described herein, for application to a model-based tool as illustrated in FIG. 1.

An advantage of the present invention over the prior art is in allowing the user of a system-level test-program generator to request possibly complex scheduling scenarios between transactions. These scenarios are all meaningful at the system-level, and may be requested in a simple manner on top of other requests to the test-program generator, without interfering with those other requests. Transactions may also be requested with no scheduling relations between them (partial specification), allowing for more randomness of the test. The algorithm of the present invention also implements the requests in a way which requires only simple modeling by the user, even though in some cases the ordering between transactions may appear complex and involve a large number of transactions.

It will be understood that a system according to the present invention may be a suitably-programmed computer, and that a method of the present invention may be performed by a suitably-programmed computer. Thus, the invention contemplates a computer program product in a computer-usable medium (including, but not limited to magnetic media, optical media, and networks) having computer-readable program code for emulating or effecting a system of the invention, or any part thereof, or for executing a method of the invention, or any part thereof. The invention further contemplates a program storage device readable by machine, tangibly embodying a program of instructions executable by the machine to perform a method of the invention. The term computer program herein denotes any collection of machine-readable codes, and/or instructions, and/or data residing in a machine-readable memory or in machine-readable storage, and/or accessible over a network, and executable by a machine for emulating or effecting a system of the invention or any part thereof, or for performing a method of the invention or any part thereof.

Therefore, according to the present invention there is provided a random test-program generator device for generating a verification program to confirm the operation of a system under test, the test-program generator device including a transaction scheduler configured for: (a) receiving input from a request file that includes at least one prescriptive scheduling statement which specifies the scheduling of a system-level transaction; (b) processing the at least one prescriptive scheduling statement, (c) generating code fulfilling the at least one prescriptive scheduling statement, and (d) placing the code into a testcase to form at least part of the verification program.

Furthermore, according to the present invention there is also provided a random test-program generator device for generating a verification program to confirm the operation of a system under test, the test-program generator device including a transaction scheduler configured for: (a) receiving input from a request file that includes at least one prescriptive grouping statement which specifies the grouping of at least one member, the at least one member specifying at least one system-level single-transaction; (b) processing the at least one prescriptive grouping statement, (c) generating code fulfilling the at least one prescriptive grouping statement, and (d) placing the code into a testcase to form at least part of the verification program.

Moreover, according to the present invention there is additionally provided a method for recursively generating the transactions of a request-file node, the request-file node associated with an ordering directive and having contents selected from a group containing single-transaction for a leaf and grouping of child nodes for a non-leaf, the method including: (a) determining whether the request-file node is a leaf; (b) if the request-file node is a leaf, generating a single-transaction corresponding to the request-file node and identifying and recording the initiating and notifying components of the single-transaction; (c) if the request-file node is a non-leaf, recursively performing (a) through (d) on each child node of the grouping of the request-file node; and (d) setting the initiating and notifying components according to the ordering directive associated with the request-file node.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
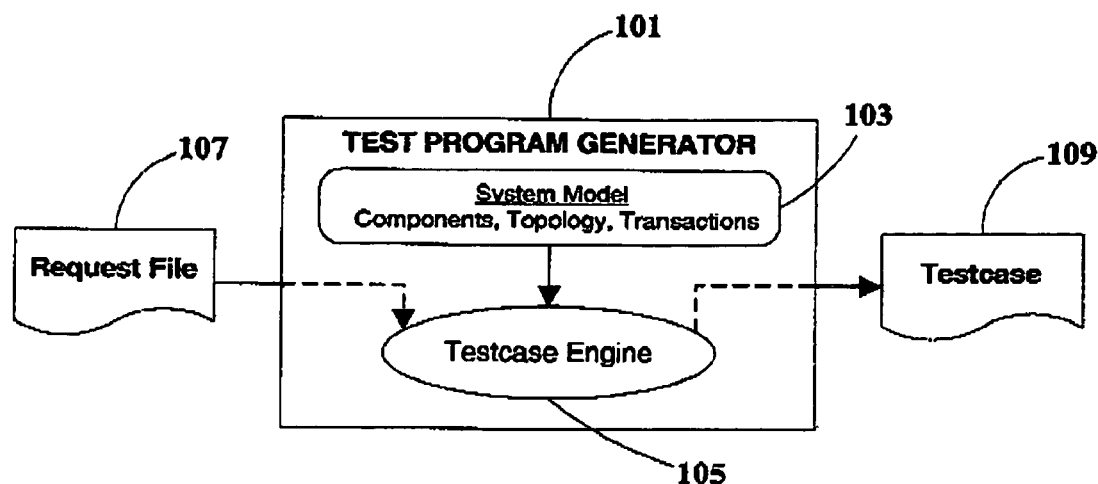
FIG. 1 shows a general model-based test-program generator.

The principles and operation of a system and method for scheduling generated test transactions according to the present invention may be understood with reference to the drawings and the accompanying description.

Basic Language Requirements

A natural, but simplistic feature of a language to support time-scheduling of transactions would be to include the assignment of real-time values to various points in each of the transactions (e.g., $T_{1,start}=12$). A complete assignment of such values unambiguously determines the ordering of all transactions. Furthermore, by interpreting the numbers to correspond to actual clock cycles, a firm connection between the ordering language and the hardware implementation is set.

In theory, a cycle-specific language of this sort could be useful from the point of view of a system-level test-program generator. In this fashion, specific bugs could be targeted by applying accurate timing requests to vulnerable areas. A request for two transactions going through the same bus-bridge within, for example, three cycles from each other may well serve to verify the bridge. However, specifying such low-level parameters in a system-level design incurs two major practical obstacles. First, the initial development of the test-generator model would require very large resources. Second, maintaining the tool would be an equally large task because small variation in the system may require significant changes in the model. Such a tool would be practical only in the final development stages of a stabilized design.

Without cycle-level resolution, even the mere notion of when a system-level transaction starts or ends requires some elaboration. High-level system transactions are composed of a multi-tiered hierarchy of lower-level events. However, in the context of a language relating to the high-level view, it makes little sense to define the starting and ending points of the system-level transactions in terms of the lowest-level events (even if there were agreement on what the lowest level is). Hence, any reference to a beginning or an end of a system-level transaction is meaningful only in a high-level view. The starting and ending points of different transactions of the same type may seem quite different when viewed at a sufficiently low level (this is true of any point within the transaction). To illustrate this point, consider the starting point of a processor instruction. This starting point cannot be associated with low-level events because there is no single mapping between the instruction and these events. For example, a dispatched instruction within a branch may never be issued because the branch may not be taken. Similarly, an instruction may be issued more than once because of an exception. Accepting that transactions are characterized only by their high-level properties leads to the following observation: Each high-level transaction may be executed in various low-level ways, and in each execution the transaction may consume a different amount of time, depending on the state of the system at the time of execution. Therefore, there is no way to know in advance the duration of a given system-level transaction. The transaction CPU-To-Mem-Data-Transfer, for example, may or may not hit a memory cache-line, depending on the current state of the cache. This execution-time property of the system strongly affects the duration of the transaction.

Figure 2:
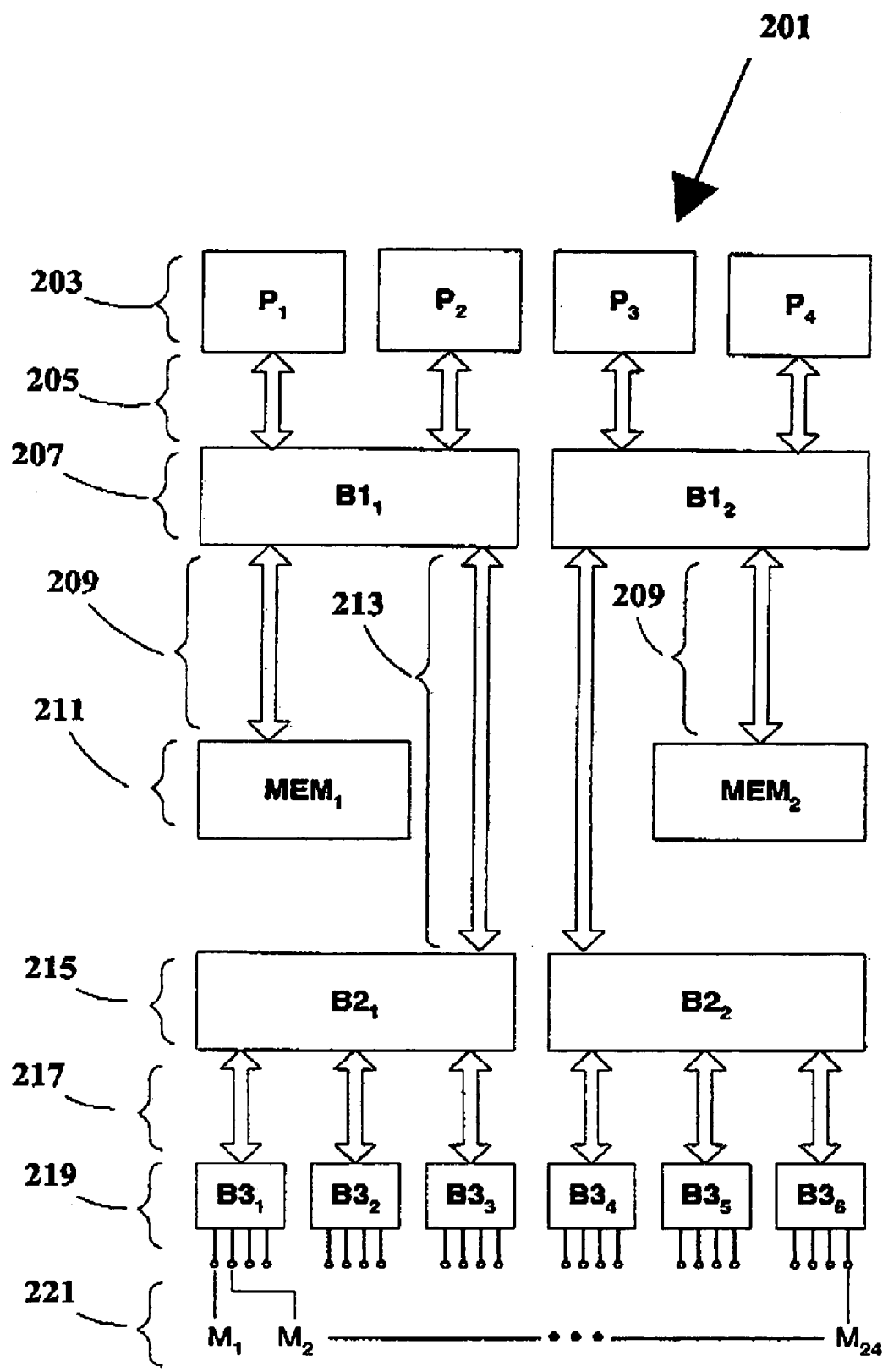
FIG. 2 shows the components of an exemplary system to which the principles of the present invention may be applied.

Although the concept of cycle-level resolution must be abandoned for a transaction, it is still possible to have some information about the lower-level structure. For example, all transactions going from $P_3$ to any of the I/O behaviorals must pass through bus-bridge $B1_2$ (see FIG. 2). Although it is impossible to know in advance the time it would take for the transaction to reach $B1_2$ (for reasons similar to those discussed above), it is still possible to have $B1_2$ notify when the transaction has arrived. The term notifying component herein denotes such a component. When all notifying components of a transaction have notified, the transaction is said to have ended.

(As a general rule, the actual events specifying the end of the transaction are somewhat arbitrary. The execution of the transaction may trigger other events in the system that are not part of the transaction only because of a possibly arbitrary definition.)

With this understanding, the basic requirement of a scheduling-language for system-level transactions is stated below in Proposition 1:

PROPOSITION 1. In a set of system-level transactions where no cycle-level resolution information is available for any of the transactions, a transaction scheduling language can neither relate to the duration of any specific portion of a transaction, nor can specify the time that any specific point in the transaction is reached. At most, the language may specify the timing of the starting point of the transaction, and may be assumed to recognize, after the fact, that the transaction has reached any of a set of specified points.

In particular, Proposition 1 implies that the language cannot relate to the duration of any transaction, and cannot specify when a transaction ends. Note also that time and duration above do not necessarily refer to clock cycles. Proposition 1 is, in fact, much more general, and implies that a system-level scheduling language cannot have constructs with semantics such as wait for a time equal to the duration of transaction X or end transaction Y after transaction Z has begun but before transaction Z has ended.

A Preliminary Step the N/S Language

As a first step towards designing a system-level scheduling language, Proposition 1 is applied to the natural real-time language described previously, to create a language denoted herein as the n/s language (for notify/start language).

First, as already discussed, it is necessary to abandon the interpretation in which the real-time values correspond to actual clock cycles. Second, because of the inability to specify the duration of any part of a transaction, the values in the original language retain only the semantics of after (>), before (<), and at rendezvous (=), while the numerical time difference between values in the after and before relationships has no significance (and the precise meaning of at rendezvous in the present context is discussed below). Third, the semantics of a value assigned to the beginning of a transaction are both descriptive and prescriptive (i.e., may be used to specify conditions on the time the transaction starts), while the semantics of values assigned to non-starting points of a transaction are only descriptive (i.e., may be used only by other transactions in order to condition the starting time thereof). As a result, only the following relations are semantically meaningful:

$s_i < s_j$, $s_i = s_j$, $n_{i,k} < s_j$,  Equation (1)

where $s_i$, $n_{i,k}$ denote the starting point and the $k^{th}$ notifying point of transaction $T_i$, respectively. The last notifying point reached by transaction $T_i$ is denoted by a special symbol $e_i$ (in general, only after the execution of the transaction can it be known which of the $n_{i,k}$ is equal to $e_i$).

Thus, the n/s language consists of the set of points $\{s_i, n_{i,k}\}$ for each transaction $T_i$, and the two operators < and =. It is legal in the n/s language to omit specifying any ordering relation for some or all starting and notifying points of transactions. In this case, any consistent scheduling of these points is permitted. This ability to make a partial-specification is especially useful in test-program generators, which rely heavily on randomness of generated transactions.

The n/s language, if augmented by the logical operators ∨(Boolean OR) and ∧(Boolean AND), appears to be the most general scheduling-request language that conforms to the basic requirement for system-level transactions, Proposition 1. The n/s language therefore stands as a limit of what can and cannot be scheduled by a general system-level request language, and will be used as a reference point for the present invention. Note, however, that it is also possible to think of order-related conditional statements that are meaningful for system-level transactions, and which are not given by Equation (1). An example of this is if $n_{1,2} < n_{2,2}$ do $e_3 < s_4$.

The conditional part, however, $n_{1,2} < n_{2,2}$ is not part of the scheduling language.

In some ways, the semantics of the n/s language as presented above but having only a single $n_{i,k}$ for each transaction (signifying the end) have similarities with the semantics of Lamports ordering language. There are, however, major differences, and the two are not equivalent. In Lamport, two binary ordering operators are defined for general high-level events A and B. The first of Lamports ordering operators means that all low-level events of A precede all low-level events of B, whereas the second of Lamports ordering operators means that some low-level events of A precede some low-level events of B. The first of Lamports operator is identical to $e_i < s_j$ in the n/s language, and means that transaction j starts after the end of transaction i, with no overlap between the two. The second of Lamports operators, however, allows for the possibility of finite overlap between the two transactions, and does not have a parallel in the n/s language. This difference stems from the fact that Lamports language is descriptive, whereas the n/s language is prescriptive. Because there is no way of knowing when a transaction is going to end, there is no possibility for an ordering operator prescribing the start of one transaction to begin before the end of another. On the other hand, Lamports language has no explicit parallel to the n/s language constructs $s_i = s_j$ and $s_i < s_j$ which can be used to prescribe specific scheduling relations between the beginnings of transactions i and j, and are thus useful in the context of a request language for system-level transactions. Thus, Lamport does not anticipate a scheduling language derived from the principles of the n/s language, nor does Lamport anticipate a test-generator scheduling system according to the present invention.

It is noted that the term prescriptive herein denotes a language, or portions thereof (including, but not limited to declarations, pragmas, directives, definitions, expressions, and statements in the language), which can be used to specify or determine an outcome, whereas the term descriptive herein denotes a language, or portions thereof, which can only characterize an externally-determined condition. The term directive herein denotes a general prescriptive form within a language, from which specific statements may be constructed. The term statement herein denotes a specific instance of a directive employed within the context of a program written in the language. In other words, a directive may be configured as a statement within a testcase or program. The term request herein denotes a conditionally-executed prescriptive statement which may be satisfied when conditions permit.

A Practical System-Level Scheduling Language

The n/s language presents problems when used as an actual scheduling language for test-program generators for two main reasons. First, it is cumbersome to describe high-level scheduling scenarios within the n/s language. Even a simple case of requesting, for example, 500 transactions to end before beginning 300 other transactions involves too many specifications in the request file. Second, with a language such as the n/s language, it is easy to inadvertently request deadlock scheduling scenarios. For example, the set $e_1 < s_2$, $e_2 < s_3$, $e_3 < s_1$ is a simple case of a specification that results in a deadlock, as is the single expression $n_{i,k} < s_i$.

The present invention discloses a practical request language derived from the principles of the n/s language and having limited expressiveness in comparison with the n/s language, but which overcomes both of the above problems. The derivative prescriptive language is hierarchical, with scheduling statements that apply to various scopes within the hierarchy. Hence, the derivative prescriptive language according to the present invention is herein denoted as the Hierarchical Scheduling Language.

Hierarchical Structure

Figure 3:
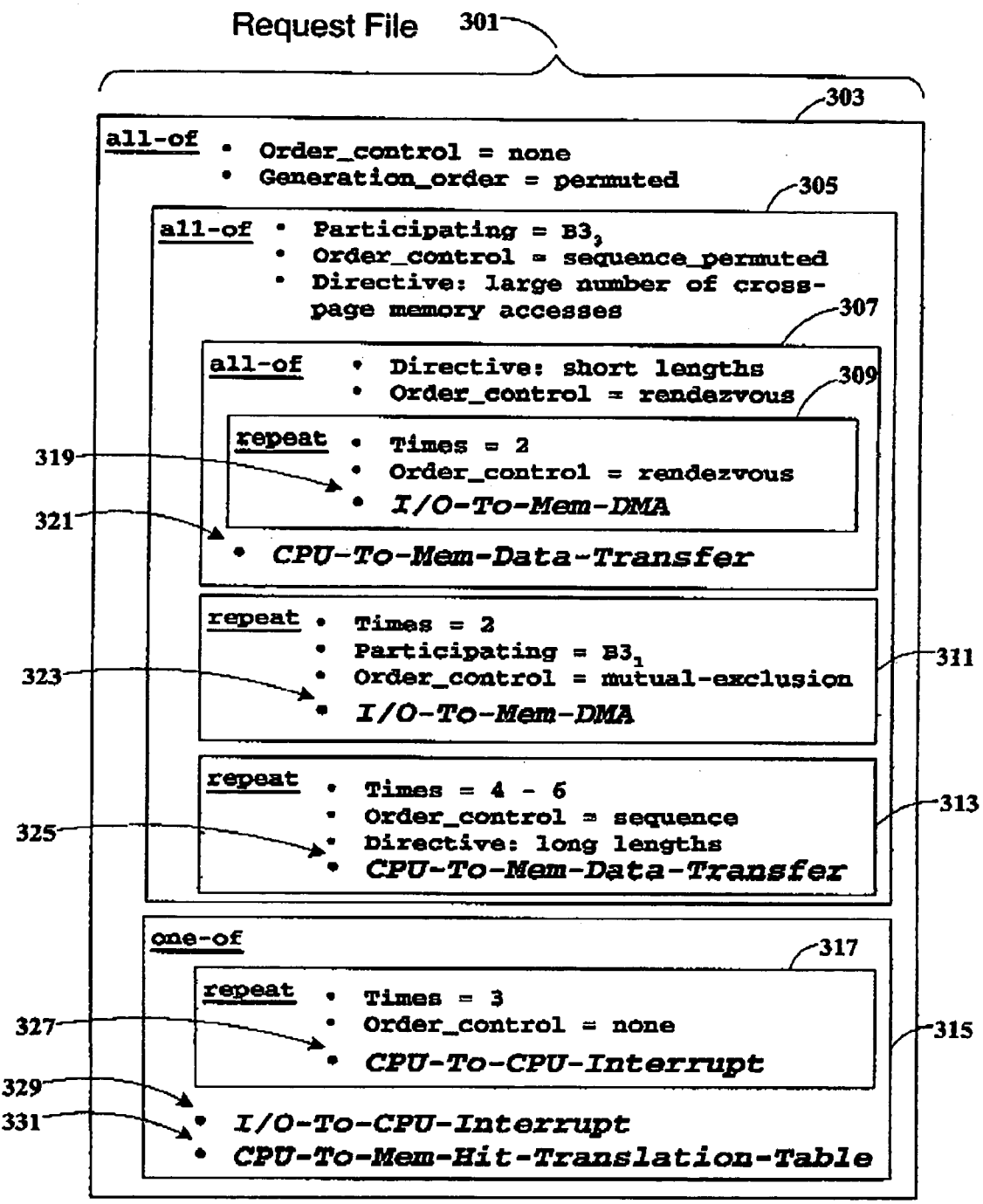
FIG. 3 shows a Hierarchical Scheduling Language request file structure according to the present invention.

FIG. 3 shows a medium and high-level view of a request file 301 exemplifying the hierarchical structure of the Hierarchical Scheduling Language, according to the present invention. The basic building blocks of the Hierarchical Scheduling Language are system-level transactions such as I/O-To-CPU-Interrupt or CPU-To-Mem-Data-Transfer. The various attributes of each transaction (e.g. address, specific participating component, or CPU instruction) can be constrained by the user. In cases where no constraint has been specified, the test-program generator chooses a suitable value.

Grouping Directives

The Hierarchical Scheduling Language lets the user create a test that suits the specific needs of the verification plan by grouping or scoping transactions into a context-based hierarchy, while allowing many open parameters to be determined by the test-program generator. FIG. 3 illustrates an all-of grouping 303, an all-of grouping 305, an all-of grouping 307, a repeat grouping 309, a repeat grouping 311, a repeat grouping 313, a one-of grouping 315, and a repeat grouping 317. (The different types of transaction groupings, as well as single-transactions, are defined below.) Each grouping includes a specified set of members (or set elements). Members of a grouping can include both single-transactions as well as other groupings, subject to the restriction that every grouping must specify (either explicitly or implicitly through recursion) at least one single-transaction (e.g.: CPU-To-Mem-Hit-Translation-Table, CPU-To-CPU-Interrupt, and I/O-To-CPU-Interrupt in grouping 315). In addition, a transaction grouping includes directives to force all members of the grouping to behave in some common way. Such directives may be either specific (e.g., the assignment of a shared target address) or more permissive (e.g., the directive for short transactions having less than an arbitrarily-specified number of bytes as in grouping 307; or for cross-page accesses as in grouping 305). Scoped directives allow different parts of the test to behave in different ways, according to specific verification needs. At the same time, scoped directives provide high-level means to specify test programs. Another advantage is that the transaction grouping structure allows simple and concise control over the type and number of transactions generated in a test. This is achieved by three types of transaction-grouping directives, which are defined as follows:

all-of, denoting any grouping containing a multiplicity of single-transactions or transaction groupings, all of which are generated;

one-of, denoting any grouping containing a multiplicity of single-transactions or transaction groupings, only one of which is generated (a non-limiting example of selecting a single member of a grouping in a one-of statement is to pick a single member according to a random choice with an assigned weighting); and repeat, denoting any grouping (as in grouping 313) which has only one single-transaction which is generated a multiplicity of times over a domain specified as an attribute of the grouping (a non-limiting example of selecting a multiplicity over a domain in a repeat statement is to randomly choose an integer between a lower and upper limit).

In addition to the grouping directives and statements based thereon, there is a single-transaction, such as a single-transaction 319, a single-transaction 321, a single-transaction 323, a single-transaction 325, a single-transaction 327, a single-transaction 329, and a single-transaction 331. The term single-transaction herein denotes any member (or set element) which is not a grouping. Every grouping requires at least one single-transaction statement, which forms the end-node of the grouping, as discussed in detail in the section on System Data Structures and Formal Descriptions.

For each grouping directive, prescriptive attributes are used to refine the directives semantics. Examples are the domain Times from which the number of times to repeat is chosen (as in grouping 309), or the attribute generation-order of all-of, which determines whether the generation order is given or is a random permutation of the given order.

A member of a grouping is not necessarily a single-transaction. A grouping may itself be a member of a higher level grouping, thus establishing the hierarchy of the language, as depicted, for example, by grouping 307, in which grouping 309 is a member. The hierarchy can also be viewed as a tree in which the topmost grouping is the root, each of the grouping statements is a node, and the transactions are leaves. This view is a natural one when using hierarchy-oriented editors and is thus useful for writing and editing the request file. Conflicting directives within the hierarchy are resolved by applying the lowest-level directive.

Scheduling Directives

It is first necessary to define the order-related aspects of groupings, because a grouping may include a grouping as a member (such as grouping 315 in FIG. 3, which includes grouping 317 as a member). The start of a grouping is defined recursively as the start of the first-executed member of that grouping, and the end of a grouping is recursively defined as the end of the last-executed member of that grouping.

The present invention defines four types of scheduling-related directives, which maybe attached to both all-of and repeat groupings:

sequence, denoting a sequencing wherein all members of the grouping are executed one after the other, with no overlap between them;

rendezvous, denoting a sequencing wherein all members in the grouping wait until all other members are ready to start their respective transactions;

mutual-exclusion, denoting a sequencing wherein no member of the grouping has an overlapping execution with any other member of the grouping; and none, denoting the default condition, when none of the above scheduling-related directives is specified.

Below are some amplifying remarks concerning the above operators when applied to members of a grouping.

The sequence directive does not mean that other transactions, perhaps from entirely different branches of the request file, may not be executed concurrently with the sequenced transactions. For example, a sequence between transactions $T_1$ and $T_2$ means that $T_2$ begins after the end of $T_1$, but it may happen that $T_3$, which is outside the scope of a sequence statement, is executed concurrently with $T_1$ and/or $T_2$. There are two types of sequence scheduling directives in the context of an all-of grouping directive:

sequence-as-ordered, in which the sequencing is performed exactly as specified; and sequence-permuted, in which the test-program generator chooses a random permutation of all members in the grouping and sequences the members according to this permutation.

Because a repeat grouping has only a single member, it is clear that the above sequence directive types are identical in the context of a repeat grouping, and therefore a simple sequence statement can be used in a repeat grouping, as is illustrated in grouping 313 (FIG. 3).

A sequence statement is identical to the following statement in the n/s language, provided that the members are ordered according to the permutation defining the ordering of the sequence.

$$\forall i>1,\ e_{i-1}<s_i,\qquad\text{Equation (2)}$$

where $\forall i$ means for all i.

A rendezvous request directs that all members in the grouping start their execution at rendezvous. However, since the system-level transactions are not synchronized to a cycle-level time resolution, it is necessary to define what is meant by rendezvous: A rendezvous request merely directs that all members of the grouping wait until all other members are ready to start their transactions. Note that this does not guarantee that all transactions under rendezvous will start in close proximity. In fact, once the rendezvous is achieved, a member participating in the rendezvous may continue to wait without limit before starting the relevant transaction(s). Nevertheless, the rendezvous mechanism provides a concise high-level way to stress a particular area (e.g., a resource shared between all rendezvousing transactions) with a large probability of concurrent access. In the n/s language, a rendezvous statement is identical to $$\forall i,j,\ s_i=s_j.\qquad\text{Equation (3)}$$

A mutual-exclusion request directs that there be no overlap between any two members of the grouping. In other words, once a member transaction has started, no other member transaction may start until the currently-executing transaction has ended. Note that there is a subtle difference between mutual-exclusion and sequence-permuted scheduling: in both cases there is a non-overlapping sequential execution without advance knowledge or specification of the order of execution. However, the order of a sequence-permuted chain of transactions is determined at generation time, whereas the order of a mutual-exclusion chain is determined at execution time. This difference may lead to qualitatively different tests. A mutual-exclusion statement is identical to the following statement in the n/s language:

$$\forall i\neq j,\ e_i<s_j\vee e_j<s_i,\qquad\text{Equation (4)}$$

with the understanding that in the n/s language the logical operators < and > relate to execution ordering, not generation ordering.

A none request does not direct any ordering relations between the direct members of the grouping. A none statement is identical to not specifying any relation between the relevant transactions in the n/s language.

It is noted that the above nomenclature (or keywords) for directives, statements, and requests (specifically, in the terms all-of, one-of, repeat, rendezvous, sequence, sequence-as-ordered, sequence-permuted, and mutual-exclusion) is non-limiting and is for the purposes of identification only. Any other terms which have substantially identical behavior according to the definitions given above are considered to be equivalent to the corresponding terms used herein.

Comparison of the Hierarchical Scheduling Language with the N/S Language

The Hierarchical Scheduling Language has a clear advantage over the n/s language in at least one major aspect: Complex scheduling-requests can be expressed by the Hierarchical Scheduling Language in a rather simple and concise way. This advantage is crucial in the context of test generation because some useful testing scenarios are complex enough even without scheduling requests. The fact that scheduling statements in the Hierarchical Scheduling Language fit into the existing hierarchical structure reduces the cost of usage tremendously.

To appreciate how the complex semantics of a typical scheduling request scenario can be captured by the simple constructs of the Hierarchical Scheduling Language, refer again to FIG. 3. Here, several groupings of memory-access transactions have been requested for sequential execution. Note that grouping 305 has a directive for a large number of cross-page accesses, and within the sequential execution there are requests for both rendezvousing transactions in groupings 307 and 309 as well as mutually-excluded transactions in grouping 311. In addition to (and possibly concurrently with) the memory-access transactions, interrupt or translation-table-access transactions have been requested for grouping 317. These are not constrained in their execution times (because of the order_control=none statement of grouping 303), and can be thought of as semi-random background-noise intended to interfere with the memory-access transactions of grouping 305. In addition, the Hierarchical Scheduling Language does not have any combinations of constructs that may lead to deadlocks, as does the n/s language. This is a significant advantage when creating and maintaining complex request files. Independently of the issue of scheduling, the concept of groupings (which is central in the Hierarchical Scheduling Language) provides significant benefits. Groupings, for example, allow a compact representation of a request in which large sets of transactions share certain characteristics.

The most apparent advantage of the n/s language over the Hierarchical Scheduling Language is in having a wider expressiveness: the n/s language can express valid scheduling relations that are impossible to express in the Hierarchical Scheduling Language, where scheduling requests must always be attached to groupings. For example, the n/s language can express a request involving four transactions: $e_1 < s_3 \hat{} e_2 < s_4 \hat{} e_1 < s_4$. The closest approximation of this in the Hierarchical Scheduling Language is a sequence of the groupings $\{T_1, T_2\}$ and $\{T_3, T_4\}$. However, such a sequence also implies $e_2 < s_3$, which is not part of the n/s language request. In addition, the Hierarchical Scheduling Language currently has no ability to express the analogs of either $$s_i < s_j;$$

or $$n_{i,k} < s_j \text{ with } n_{i,k} \neq e_i.$$

The above limitations involve several types of expressions that are beyond the capabilities of the Hierarchical Scheduling Language, principally because scheduling requests therein are tightly-coupled to the hierarchical structure. In addition, there are currently only three scheduling operators in the Hierarchical Scheduling Language: sequence, rendezvous, and mutual-exclusion. Other operators may be useful for system-level scheduling requests, and any new operator that integrates into the languages hierarchical structure can easily be added.

In spite of the above limitation on expressiveness, however, the Hierarchical Scheduling Language has enough power to express virtually any useful test-generator scheduling request of practical interest. By doing so in a simple manner, the Hierarchical Scheduling Language offers significant advantages over the n/s language, and thereby represents an advance over the prior art, which lacks such a methodology.

Modeling and Implementation

Below is presented a methodology for applying the Hierarchical Scheduling Language as the input request language of a model-based random test-program generator. This methodology describes how to model transactions and mechanisms of synchronization, as part of the system model shown in FIG. 1. Following this is presented an algorithm that allows testcase engine 105 to generate tests accordingly. The model and testcase engine, when put together, achieve the generators role with respect to scheduling statements in the request file: to produce a test that, when executed on the design under verification, realizes a requested partial order.

Figure 4:
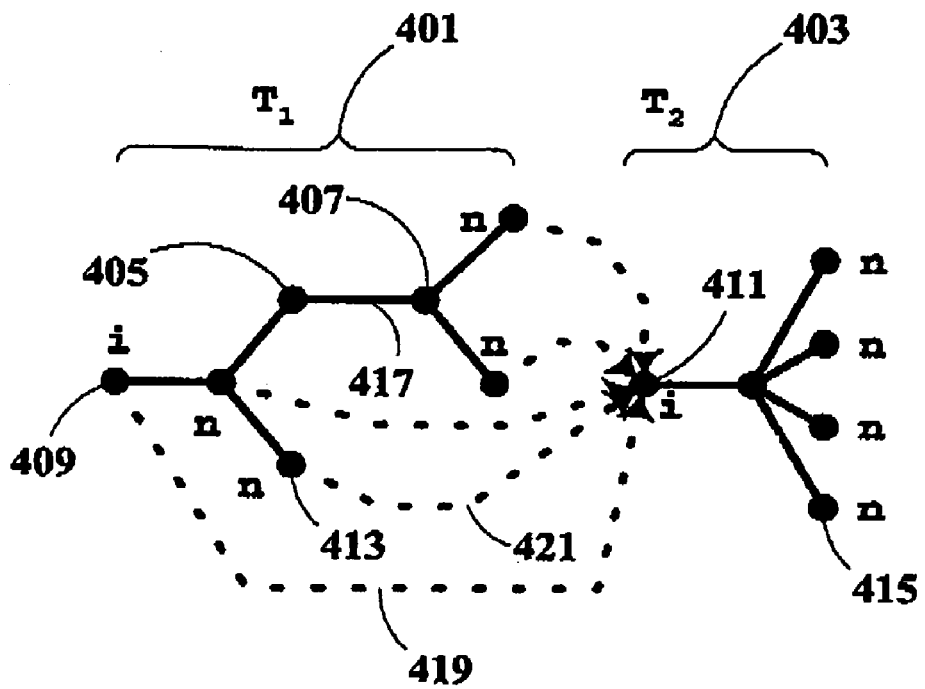
FIG. 4 shows an example of a communication scheme between two transactions.

FIG. 4 illustrates a communication scheme between a transaction 401 ($T_1$) and a transaction 403 ($T_2$). Components are indicated by nodes, such as a component 405 and a component 407. Initiating components are denoted by the letter i, such as an initiator 409 and an initiator 411. Notifying components are denoted by the letter n, such as a notifier 413 and a notifier 415. Solid lines represent the interaction between components within the transaction, such as an interaction 417 between component 405 and component 407. Dotted lines represent the communication between transactions, such as a communication 419 between initiator 409 in transaction 401 and initiator 411 in transaction 403, and a communication 421 between notifier 413 and initiator 411.

Modeling of Transactions

Hierarchical Scheduling Language scheduling requests are expressed in terms of relations between transactions. Therefore it is necessary to first describe a sufficient model of a transaction, and then describe the meaning of scheduling-related aspects, such as the beginning and end of a transaction. As noted previously, the Hierarchical Scheduling Language, in addition to providing a convenient descriptive and prescriptive formalism, also provides underlying concepts that are basic to the transaction model, as is discussed below.

A high-level view of the transaction model includes the components participating in the transactions and the way in which these components interact (e.g., in an I/O-To-CPU-Interrupt transaction, an I/O device sends an interrupt to the interrupt controller, which in response routes the interrupt to the appropriate processor). In particular, each transaction has exactly one initiator component, and one or more notifiers. The transaction begins when the initiator starts the transaction (e.g., a processor starts executing an instruction) and ends when all processes belonging to the transaction in each of the notifiers have notified. The decision of which processes are considered part of the transaction (and even the choice of the notifiers themselves) may be arbitrary. However, a requirement on the notifiers and their notifying processes is that the notifying processes are executed each time the transaction is executed. Transactions communicate with each other through their respective initiators and notifiers, which are collectively referred to as communicating components. FIG. 4 shows the general communication scheme between two transactions. In this example, all of the notifiers of transaction 401 are capable of informing initiator 411 of transaction 403 that the relevant processes have ended. Furthermore, a transactions initiator is capable of informing that the transaction is ready to start, and is also capable of accepting messages from any communicating component. This is illustrated in FIG. 4 with communication 419 from initiator 409 to initiator 411.

An example of a modeled transaction is I/O-To-Mem-DMA. Here, an I/O behavioral sends a read or write request to a specific memory address. The bus-bridges that receive the request perform address translations and other operations on the data they receive, and send the data towards the appropriate memory. At the end of the transaction the behavioral is acknowledged that the data has been received by (or fetched from) the memory. At this stage the transaction has ended, and the behavioral, which is both the initiator and the only notifying component in this transaction, is ready to notify that the processes are completed.

Figure 7:
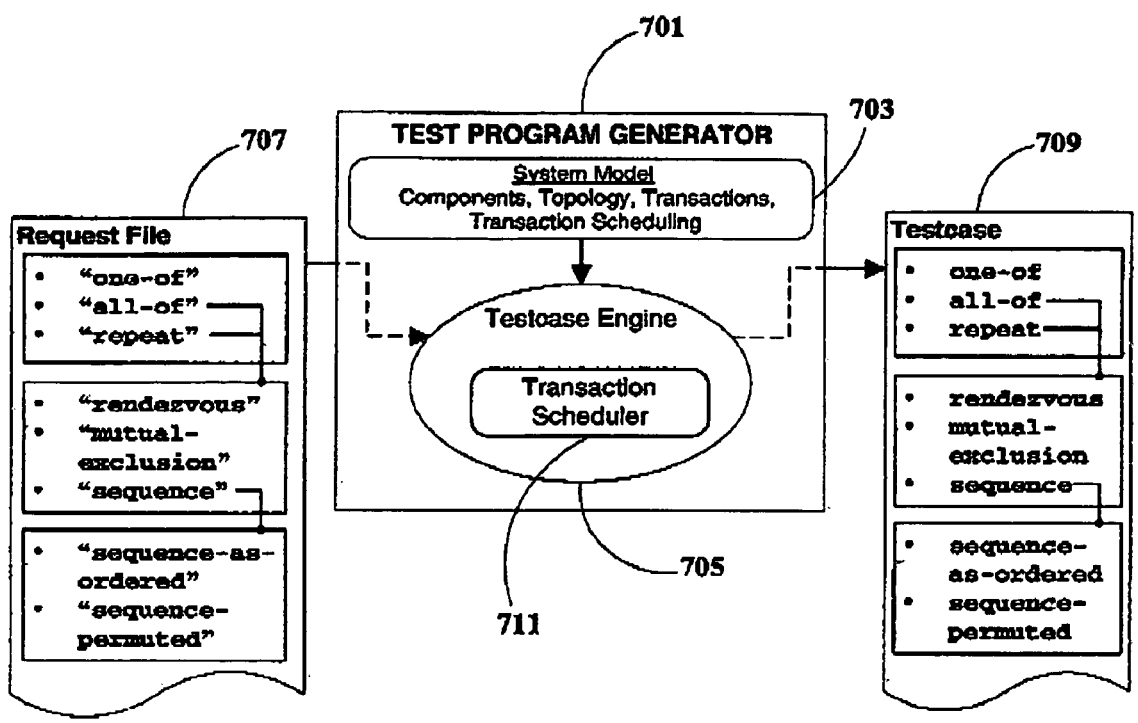
FIG. 7 shows the conceptual operation of a transaction-scheduling test-program generator according to the present invention.

FIG. 7 illustrates a test-program generator 701, which is capable of scheduling transactions according to the present invention. A request file 707 includes scheduling statements (source-language request statements such as ell-of, one-of and so forth, which are shown in quotation marks to indicate that these are literal source-language statements). In addition to the modeled elements of system model 103 (FIG. 1), a system model 703 also includes transaction scheduling. Furthermore, a testcase engine 705 also incorporates a transaction scheduler 711, which enables test-program generator 701 to process the grouping and scheduling requests in request file 707 and to realize the grouping and scheduling requests in a testcase 709, by receiving input from request file 707, processing grouping and scheduling statements therein, generating code fulfilling the grouping and scheduling statements, and placing this code into testcase 709 (which thereby contains code corresponding to all-of, one-of, and so forth, which are shown without quotation marks to indicate that those are symbolic of actualized code) to form part of the generated verification program. It is noted that transaction scheduler 711 need not be a separate or distinct unit within test-program generator 701, but may be functionally distributed throughout test-program generator 701.

Transactions are part of the model. When a transaction is generated, the test-program generator identifies which components participate in the transaction, and gives specific values to many parameters of the transaction. To do this, the test-program generator can use internal knowledge, according to the way the transaction was modeled. Once the parameters are known, the test-program generator can create cards for each of the participating components. The cards inform the simulator of what low-level actions to do in order to realize the transaction with the parameters calculated by the test-program generator. In addition, the test-program generator also calculates the data appearing in all relevant resources (such as memory, registers, etc.) before and after the execution of the transaction.

For example, in generating a CPU-to-Memory-Data-Transfer transaction, the test-program generator may decide that CPU-8 and Memory-3 are the participants in the transaction, and that binary data 10010110 should be written to binary address 1100010100010100 by using a CPU command stb. Then, an instruction card for stb would be written to the test under the CPU-8 section. This instruction card would specify all the details of the instruction (data, address, etc). Also, an initialization card and a results card would be written to the test under the Memory-3 section. The initialization card specifies the data at the given address prior to the execution of the transaction, and the results card specifies this data after all transactions have completed execution.

Modeling of Scheduling Mechanisms

Referring again to FIG. 7, system model 703 in test-program generator 701 includes the modeling of transaction scheduling-mechanisms, and a transaction scheduler 711. A mechanism is defined for a given request type (sequence, rendezvous, or mutual-exclusion), and a given combination of communicating-component types. Not all such combinations are necessarily modeled. In practice, each of the three scheduling types forms a class in the model, and for each specific combination of communicating components an instance of that class is created.

A certain instance describes the means through which the desired scheduling is achieved. These means can either be software-related (e.g., a piece of Assembly code, if the communicating components are processors) or a directive to the simulator (e.g., directing the simulator to halt the execution of a process until a certain event occurs).

As an example, consider a sequence statement between a single notifying I/O-behavioral and three initiators, all of type Processor. In this case, the sequence scheduling may be implemented by having a shared resource initialized to some value, and letting the processors wait until this value is changed by the behavioral through a DMA. As another example, a rendezvous statement between n initiating components of type Processor may be implemented by initializing a shared memory to the value n, and letting each of the processors decrease that value by one when ready to start the rendezvousing transaction, and then wait until the value is zero. (These are naive examples. For reasons of performance and accuracy, an actual implementation may be much more complex.)

Implementing Scheduling Requests

As discussed above, part of the model of each of the transactions includes identification of the transactions initiator type and notifying-component types. However, since the scheduling requests may be applied between high-level constructs as well as between single transactions, the communicating components for these constructs must also be identified. This is done by a recursive aggregation process, according to the following rules:

sequence groupings have a single initiator, which is the initiator of the first-executed member of the grouping. The notifying components in this case are the notifying components of the last-executed member.

The set of initiators of either a rendezvous, a mutual-exclusion, or a none grouping is composed of all initiators of all members of the grouping, and the set of notifying components of these types of groupings is the conjunction of all notifying components of the members.

With this identification of communicating components of groupings it is possible to describe the algorithm for generating a general scheduling request. Starting at the lowest level of the request file (i.e., at the single-transaction level), the test-program generator first locates the communicating components of the transaction directly from the model. Then, the communicating components of the next level are determined by the generator according to the scheduling-type of this level, and the above rules. For example, the initiators of grouping 309 in FIG. 3 would be the two initiator behaviorals of the two I/O-To-Mem-DMA transactions repeated in that grouping, and the notifying components would again be the same behaviorals.

Next, for each grouping, the test-program generator identifies which of the scheduling mechanisms are to be used with this type of grouping and combination of communicating components, according to the modeling of scheduling mechanisms, as previously discussed. The test-program generator then applies these mechanisms in a way that would realize the required ordering for the grouping. For example, an implementation of a sequence between a sub-grouping with two notifying components of type I/O-behavioral, and a sub-grouping with three initiators of type Processor, may include the application of two instances of the mechanism given as an example in the previous section. According to each of the instances, a shared resource is initialized to some value, and all three processors wait until that value has changed. Each instance, however, is now applied to a different shared resource, and each of the resources is changed by a different I/O behavioral. Thus, the implementation of scheduling between high-level groupings may amount to combining several scheduling mechanisms.

The recursive process of applying scheduling mechanisms to groupings continues at consecutively higher levels, until the top-most level. The end result of this process is that by scheduling a few specified components at each level, large portions of the test may become scheduled. In other words, a scheduling of two high-level groupings may involve only a simple mechanism between a small number of communicating components, but may affect a very large number of transactions that are hierarchically far below that high-level grouping.

System Data Structures and Formal Descriptions

A random test-program generator, as illustrated in FIG. 7, can be implemented using the data structures defined as follows:

Card: The term card herein denotes any text string containing hardware code for making up a part of the generated testcase.

Figure 5:
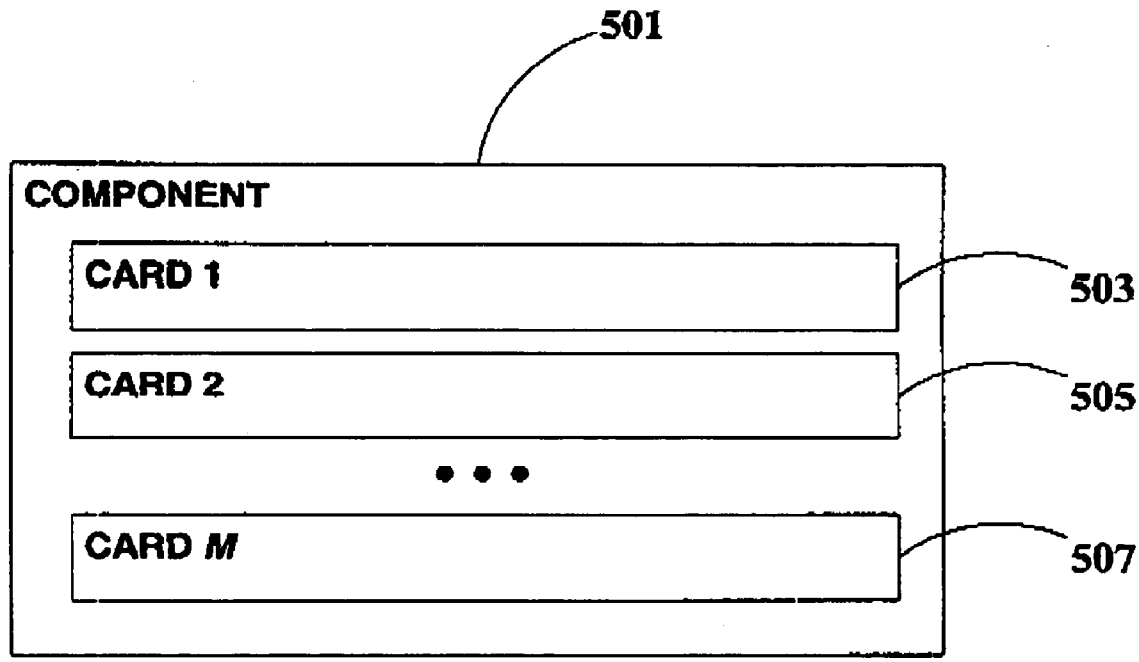
FIG. 5 shows a component containing a set of cards according to the present invention.

Component: The term component herein denotes any collection of, or container for cards, such as illustrated in FIG. 5, showing a component 501 containing a card 503, a card 505, and a card 507. Non-limiting examples of components include linked lists, tables, ordered collections, sets, and so forth. It is understood that a component according to this definition represents an actual instance of a physical component in the system. Components are explicit parts of a testcase (see below). For each component in the system there is a section in the testcase corresponding to that component.

Figure 6:
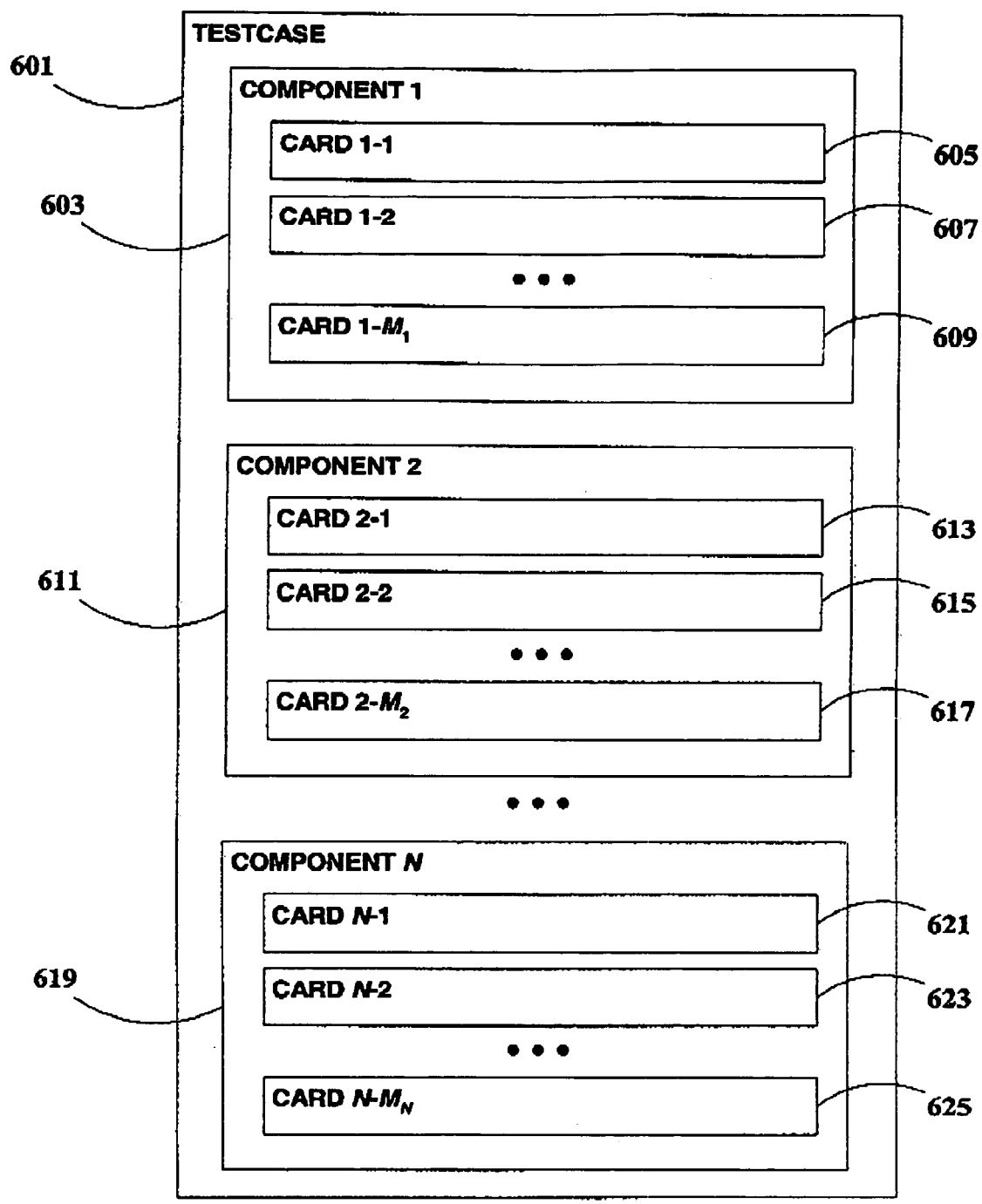
FIG. 6 shows a testcase containing a set of cards contained in a set of components according to the present invention.

Testcase: The term testcase herein denotes any collection (possibly empty) of cards listed for each of the components in a specified configuration, an example of which is illustrated in FIG. 6, showing a testcase 601 containing a card 605, a card 607, and a card 609 contained in a component 603; containing a card 613, a card 615, and a card 617 contained in a component 611; and containing a card 621, a card 623, and a card 625 contained in a component 619. Accordingly, a testcase contains code and can constitute at least part of a verification program for confirming the functional operation of a system.

Request-file node: The term request-file node (or node) herein denotes any structure containing at least some of the following data:

Statement Type: one of the following:
  a single-transaction,
  an all-of grouping,
  a one-of grouping,
  a repeat grouping;

Scheduling Type: one of the following:
  rendezvous,
  sequence,
  mutual-exclusion, none Set of pointers to cards related to order-control for initiating components.

Set of pointers to cards related to order-control for notifying components.

Figure 8:
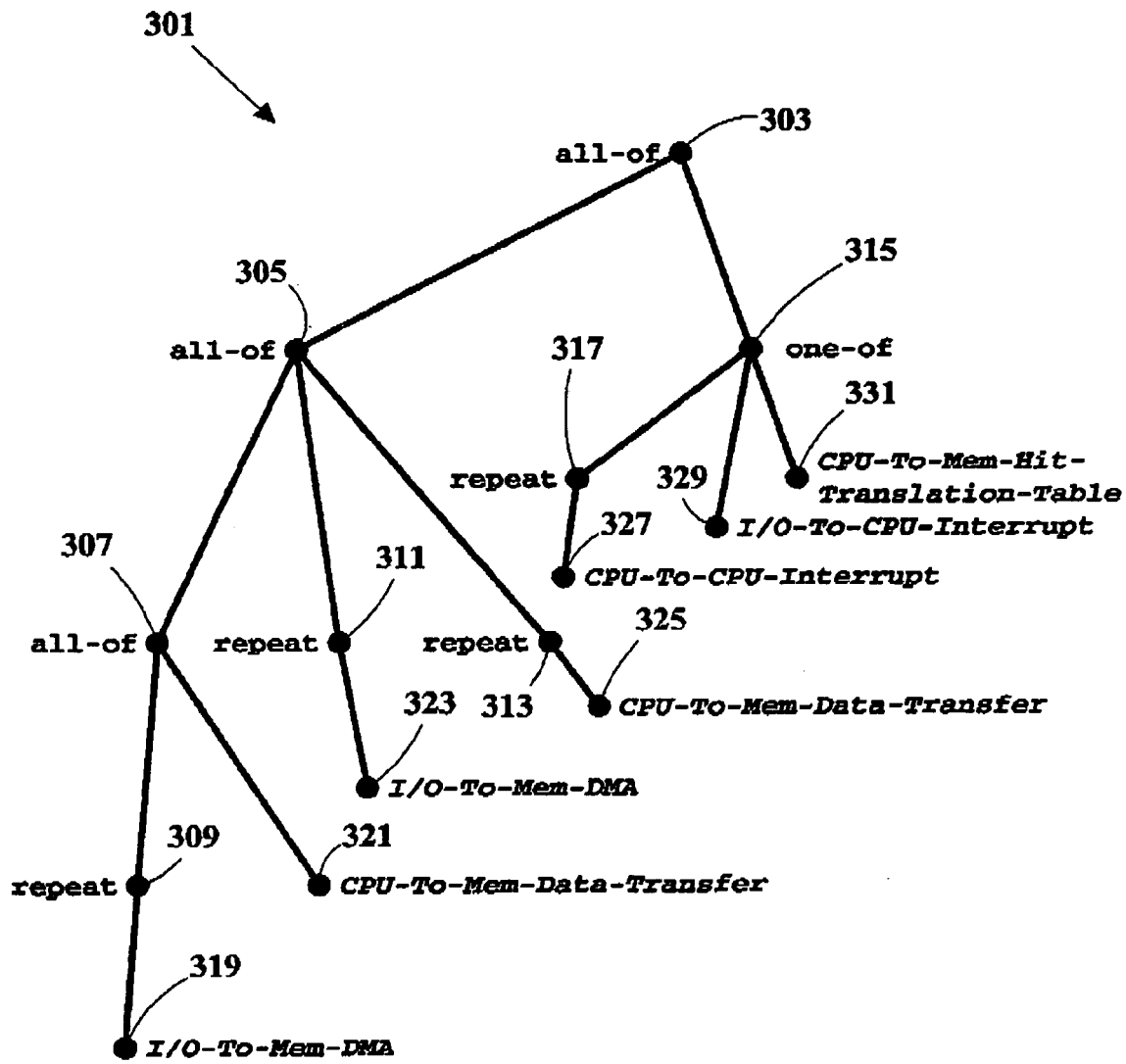
FIG. 8 shows the request file of FIG. 3 as an inverted tree.

Request file: The term request file herein denotes any test-program generator input which describes or specifies the desired transactions of the test program. In the context of the present invention, the request file is logically equivalent to a tree consisting of request-file nodes with single-transaction nodes as leaves, as illustrated in FIG. 8 for the request file shown in FIG. 3. The root of the tree is grouping 303, and the tree itself is shown in an inverted orientation.

The input to the testcase generating system includes:
a request file;
models of transactions, including the identification of initiating and notifying component-types;
models of order-control mechanisms between the various notifying component-types and initiating component-types.

The output from the system is a testcase.

The generalized flow in the system is of the form below, illustrated for a main routine which calls a recursive card generator.

```
Main  /* Start at the root of the request file, go recursively through all
         nodes (generating child-nodes first), and produce the testcase */
      call Generate (root) ; /* the Generate procedure is detailed below */
      FOR all components
          FOR all cards
              output (card) ; /* output the card to the testcase */
          END_FOR
      END_FOR
End Main
```

The recursive generator goes through the tree to cover all components and transactions specified in the request file (starting at the root, as called in Main above), and operates as follows:

(It should be noted that a node of type 'grouping' does not have any direct initiating or notifying components, only indirect initiating and notifying components of child nodes.)

```
Procedure Generate (node)
    IF (node == LEAF)     /* detect a single-transaction node */
        Generate transaction;  /* find the components participating in
                                  the transaction, calculate the cards
                                  added to each of the components due
                                  to the transaction, and add the cards
                                  to the component. */
        Add pointer to node.initiatingComponentCards;
                                  /* identify and record the transactions
                                     initiating component */
        Add pointers to node.notifyingComponentCards;
                                  /* identify and record the transactions
                                     notifying components */
    ELSE                   /* detect a grouping node */
        FOR all child nodes 'child'
            call Generate (child) ;  /* call this procedure recursively
                                        for a grouping */
        END_FOR
    /* Identify the initiating and notifying cards of the current node,
    based on the sets of initiating and notifying cards of the
    child-nodes */
    IF
    (          /* detect rendezvous, mutual-exclusion, or default
                  ordering control */
        node.orderControl ==
            (rendezvous OR mutual-exclusion OR none)
    )
        /* for rendezvous, mutual-exclusion, and default ordering
        control, use a Join operation (defined below) to combine
        the initiating components of the nodes children
        (the nodes children are the members of the corresponding
        grouping compare FIG. 3 to FIG. 8) into the
        initiating components of the node itself, and
        combine the notifying components of the nodes children
        into the notifying components of the node itself. */
        node.initiatingComponentCards =
            Join
            (
                for all child nodes 'child',
                    child.initiatingComponentCards
            ) ;
        node.notifyingComponentCards =
            Join
            (
                for all child nodes 'child',
                    child.notifyingComponentCards
            ) ;
    ELSE   /* the ordering control is sequence */
        /* set the initiating components to the initiating components
        of the first of the nodes children, and set the notifying
        components to the notifying components of the last of
```

-continued

```
        the nodes children.
        As noted previously, the children of the node are the
        members of the corresponding grouping. */
        node.initiatingComponentCards =
            children[first].initiatingComponentcards;
        node.notifyingComponentCards =
            children[last].notifyingComponentCards;
END_IF
SWITCH (node.orderControl)  /* Set the order-control in the
                               cards according to the specified
                               order-control of the node. The
                               Minimum Set Cover is defined
                               below. */
    CASE none:
        RETURN;
    CASE rendezvous:
        setOfMechanisms = MINIMUM_SET_COVER on
            set of modeled mechanisms, and
            node.initiatingComponentCards;
        FOR every mechanism 'mech' in
            setOfMechanisms:
            add the cards imposed by mech before
                the corresponding card(s) in
                node.initiatingComponentCards;
        END_FOR
        RETURN;
    CASE sequence:
        FOR i = 1 to number_of_children - 1
            beforeChild = children [i];
            afterChild = children [i + 1];
            setOfMechanisms = MINIMUM_SET_COVER
                on
                set of modeled sequence mechanisms,
                beforeChild.notifyingComponentCards,
                and
                afterChild.initiatingComponentCards;
            FOR every mechanism 'mech' in
                setOfMechanisms:
                add the cards imposed by mech before
                    the corresponding initiating
                    card(s) in
                    afterChild.initiatingComponentCards
                    and after the corresponding
                    notifying card(s) in
                    before.notifyingComponentCards;
            END_FOR
        END_FOR
        RETURN;
    CASE mutual exclusion:
        /* build an initiating vector, each element which is a
        set of initiating cards. */
        initiatingSetVector = vector of all
            child.initiatingComponentCards;
        /* build a notifying vector, each element which is a
        set of notifying cards. */
        notifyingSetVector = vector of all
            child.notifyingComponentCards;
        setOfMechanisms = MINIMUM_SET_COVER
            on
            the set of modeled mutual exclusion
            mechanisms, initiatingSetVector, and
            notifyingSetVector;
        FOR every mechanism 'mech' in
            setOfMechanisms:
            add the cards imposed by mech before the
                corresponding initiating card(s) and
                after the corresponding notifying
                card(s) ;
        END_FOR
        RETURN;
    END_SWITCH
END_IF
End Procedure
```

Some explanations of the notation above follow:

The notation child.attribute represents a specified attribute of a specified child node. The specified attribute may be a set of components.

The Join operation is defined as follows: Given a multiplicity of sets of components, the Join operation returns a single set which is the standard union of those sets.

The MINIMUM_SET_COVER operation is defined as follows: Given as input the following three sets:

a set A1 of scheduling mechanisms, each of which applies to specific sets of initiating and notifying components;

a set A2 of initiating components; and a set A3 of notifying components.

The MINIMUM_SET_COVER operation returns a single set B of scheduling mechanisms, wherein set B has the following properties:

1. Set B is a subset of set A1;
2. Set A2 and set A3 are subsets of the sets of initiating and notifying components, respectively, used by set B; and
3. Set B is the smallest set satisfying conditions 1. and 2., above.

Figure 9:
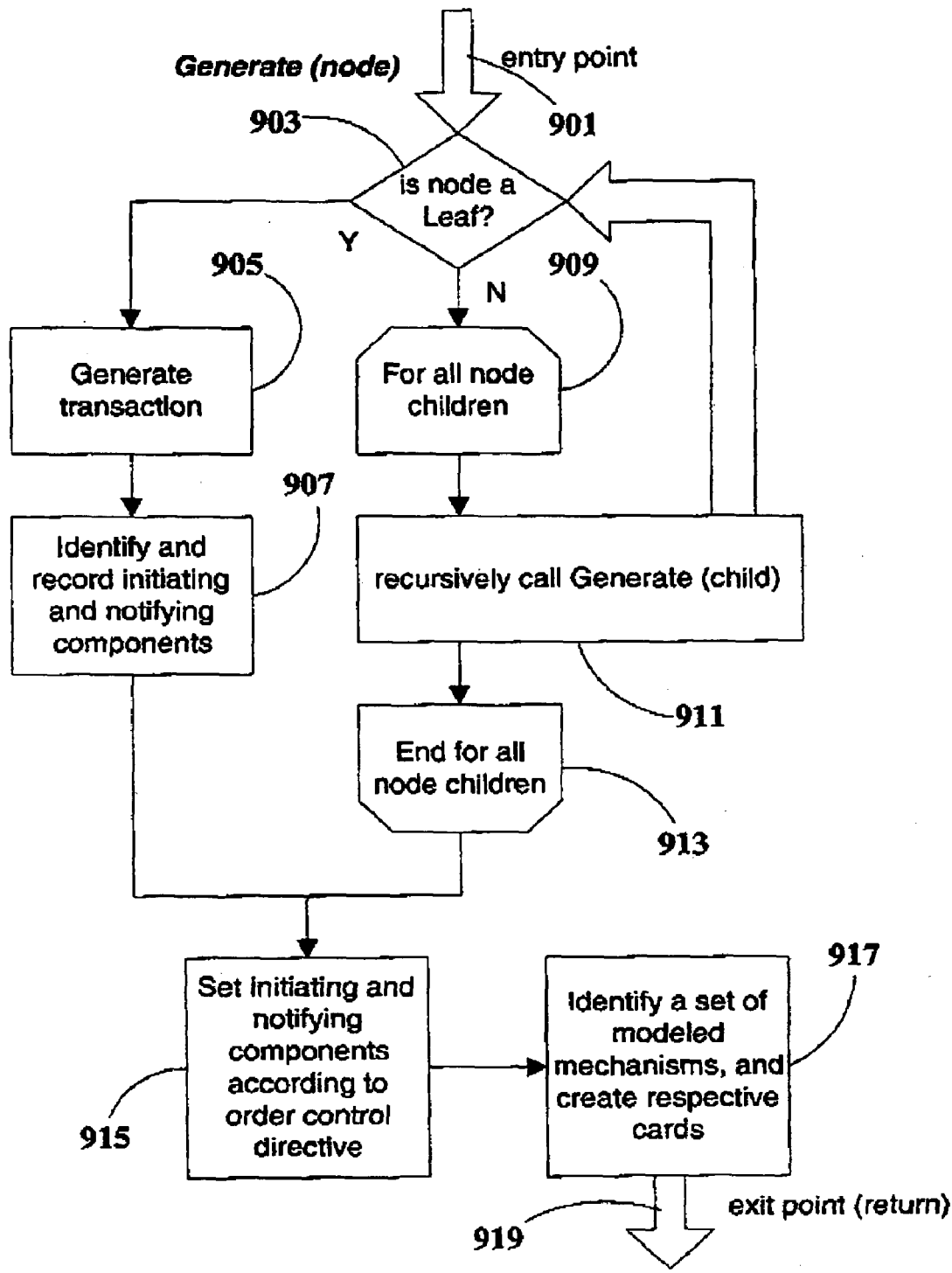
FIG. 9 shows the flow of a method according to the present invention for recursively generating the transactions of a hierarchical request file in tree form.

The above flow is generalized and illustrated in FIG. 9 as a Generate (node) function which generates the transactions for a given node as an input argument. Starting at an entry point 901, a decision point 903 checks to see if the node is a leaf of the tree (as in FIG. 8). The leaves of the tree are single-transactions, whereas all other nodes of the tree are groupings. If the node is a leaf, the single-transaction is generated in an operation 905, after which the single-transactions initiating and notifying components are identified and recorded in an operation 907. Otherwise, if the node is not a leaf (the node is a non-leaf), the grouping represented by the node is iterated for each child node from a loop beginning point 909 through a loop ending point 913. Within the loop, the Generate (node) function is recursively called with each child as an argument in an operation 911. Regardless of whether or not the node is a leaf, the initiating and notifying components are set in an operation 915, following which is an operation 917 to identify a set of modeled mechanisms and generate the respective cards, after which the Generate (node) function exits or returns at a point 919.

Thus, a method according to the present invention for recursively generating the transactions of a request-file node has the following:

(a) determining whether the node is a leaf;

(b) if the node is a leaf, generating the transaction at the node and identifying and recording the initiating and notifying components of the transaction;

(c) if the node is not a leaf, recursively performing this method on each child node of the grouping at the node;

(d) setting the initiating and notifying components according to the ordering directive associated with the node; and (e) identifying a set of modeled mechanisms for the initiating and notifying components, and creating a card for implementing the set of modeled mechanisms.

Although the invention has been described with respect to a limited number of embodiments, it will be appreciated that many variations, modifications and other applications of the invention may be made.

What is claimed is:

1. A method for generating a verification program to confirm the operation of system under test, the method comprising:

a. receiving input from a request file that includes at least one prescriptive grouping statement specifying the grouping of at least one member, said at least one member specifying at least one system-level single-transaction;

b. processing said at least one prescriptive grouping statement, c. generating code fulfilling said at least one prescriptive grouping statement, and d. placing said code into a testcase to form at least part of the verification program, wherein said at least one prescriptive grouping statement is constructed from a directive selected from a group containing: all-of, one-of, and repeat.

2. A set of transaction-grouping directives capable of being configured as input statements within a request file to a test-promgram generator and operative to specifying the grouping of system-level transactions in a system under test, said transaction grouping directives comprising at least one directive selected from a group containing: all-of, one-of, and repeat.

3. A method for recursively generating the transactions of a request-file node, the request-file node associated with an ordering directive and having contents selected from a group containing single-transaction for a leaf and a grouping with a child node for a non-leaf; the method comprising:

a. determining whether the request-file node is a leaf;

b. if the request-file node is a leaf, generating a single-transaction corresponding to the request-file node and identifying and recording the initiating and notifying components of said single-transaction;

c. If the request-file node is a non-leaf, recursively performing (a) through (d) on the child node of the grouping of the request-file node;

d. setting said initiating and notifying components according to the ordering directive associated with the request-file node; and e. identifying a set of modeled mechanisms for said initiating and notifying components, and creating a card operative to implementing said set of modeled mechanisms.

4. The method of claim 3, wherein said ordering directive is constructed from a directive selected from a group containing: rendezvous, mutual-exclusion, sequence, sequence-as-ordered, and sequence-permuted.

5. A computer program product comprising a computer-usable medium having computer readable program code embodied therein for reading a request file node and generating a verification program to confirm the operation of a system under test, the request-file node associated with an ordering directive and having contents selected from a group containing single-transaction for a leaf and grouping with a child node for a non-leaf, the computer program product comprising:

a. computer readable program code for causing the computer to determine whether the request-file node is a leaf;

b. computer readable program code, if the request-file node is a leaf, for causing the computer to generate a single-transaction corresponding to the request-file node and identifying and recording the initiating and notifying components of said single-transaction;

c. computer readable program code, if the request-file node is a non-leaf, for causing the computer to recursively performing (a) through (d) on each child node of the grouping of the request-file node;

d. computer readable program code for causing the computer to set the initiating and notifying components according to the ordering directive associated with the request-file node; and e. computer readable program code for causing the computer to identify a set of modeled mechanisms for said initiating and notifying components, and for creating a card operative to implementing said set of modeled mechanisms.

6. The method of claim 5, wherein said ordering directive is constructed from a directive selected from a group containing: rendezvous, mutual-exclusion, sequence, sequence-as-ordered, and sequence-permuted.

* * * * *